May 11, 1937. H. K. BERGHOLM 2,080,195
ABSORPTION REFRIGERATION SYSTEM
Filed April 26, 1933
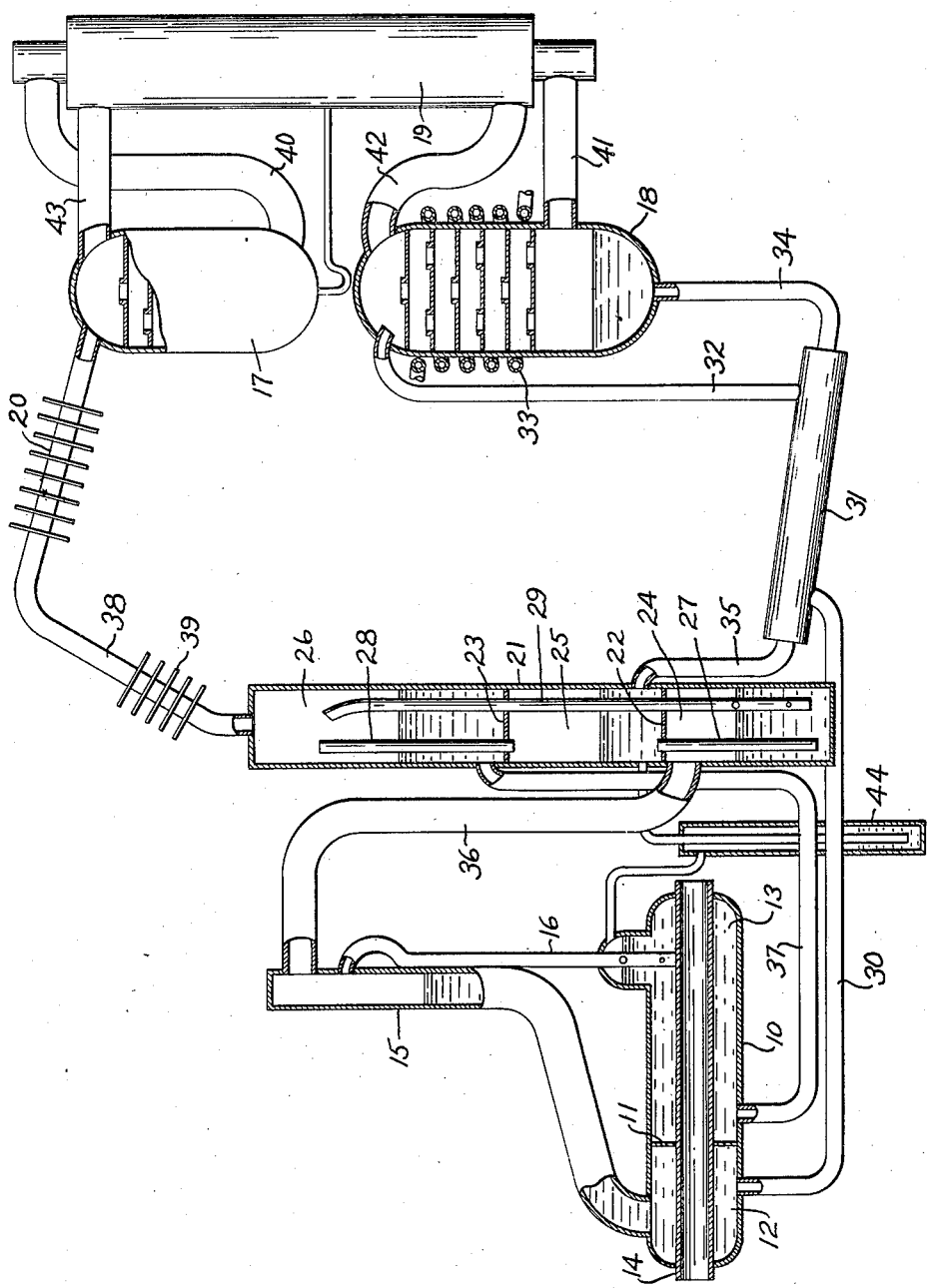
INVENTOR.
H. K. Bergholm
BY
Hyatt Dowell
ATTORNEY.

Patented May 11, 1937

2,080,195

UNITED STATES PATENT OFFICE 2,080,195

ABSORPTION REFRIGERATION SYSTEM

Harry K. Bergholm, Larchmont, N. Y., assignor, by mesne assignments, to Servel, Inc., Dover, Del., a corporation of Delaware Application April 26, 1933, Serial No. 668,027

12 Claims. (Cl. 62—119.5)

This invention relates to absorption refrigeration systems of the type in which refrigerant is evaporated by diffusion into a pressure equalizing medium and more particularly to the circulation of absorption solution in such systems.

Briefly, in refrigeration systems of this type, an inert pressure esualizing gas such as hydrogen is circulated between an evaporator and an absorber, the conduits for such gas circulation being preferably in thermal exchange relation. From a generator containing a solution of refrigerant in a liquid absorbent such as a water solution of ammonia, the refrigerant is distilled over into the evaporator and the resulting weak solution is circulated from the generator through the absorber. In the evaporator, the liquid refrigerant evaporates by diffusion into the inert gas, and in the absorber, refrigerant vapor is absorbed out of the inert gas into the weak solution. The circulation of solution between the generator and absorber is preferably accomplished by vapor lift action, the solution overflowing from a higher liquid level in the generator into the absorber, and being returned from a lower liquid level in the absorber to the generator by the vapor lift action. The circulation of gas between the evaporator and absorber is preferably accomplished automatically by maintaining sufficiently high unbalanced columns of gas, one column comprising weak gas flowing from the absorber to the evaporator, and the other column comprising rich gas flowing from the evaporator to the absorber. For efficient circulation by vapor lift action, as previously mentioned, the distance through which the solution is raised from the lower liquid level in the absorber to the higher level in the generator should be as short as possible. On the other hand, for best circulation of gas between the absorber and the evaporator, the previously mentioned unbalanced columns should be as high as possible. When such refrigeration systems are used in household refrigerators, it will be understood that the size of the apparatus unit is more or less limited by the dimensions of the refrigerator cabinet. Since it is of considerable importance to provide the greatest vertical distance possible between the absorber and the evaporator, it will be understood that the absorber should be located as near the bottom of the unit as possible, and, for best operation of the vapor lift, the liquid level in the generator should also be maintained as low as possible.

My invention has for its object to provide a refrigeration system having the above advantages and, in general, is carried out by utilizing vapor from the generator to raise solution from the level of liquid surface in the absorber to a higher level, thereby both depressing the liquid level in the generator and establishing a liquid head for the vapor lift that is greater than that maintained by the absorber if the latter were connected directly to the vapor lift. This utilization of the vapor from the generator also results in excellent analyzation thereof, which greatly decreases rectifier and condenser losses.

The nature of my invention and the objects and advantages thereof will be more fully understood from the following description taken in connection with the accompanying drawing, in which, The figure shows schematically, with parts in vertical section, a refrigeration system embodying the invention.

Referring to the figure, the generator comprises a horizontally elongated vessel 10 divided by a partition 11 into a weak liquid chamber 12 and strong liquid chamber 13. The generator is heated by suitable means such as a burner, not shown, in a flue 14 which extends through the chambers 12 and 13. A standpipe 15 communicates at its lower end with the weak liquid chamber 12. From within the strong liquid or lift chamber 13, a vapor lift conduit 16 extends to the upper end of the standpipe 15. It will be understood that the chamber 12 and the standpipe 15 constitute the main part of the generator. The chamber 13 and conduit 16 comprise essentially a vapor liquid lift. The chamber 13 and conduit 16 may be variously referred to as an auxiliary generator, a vapor liquid lift, or part of the generator. When the word generator is used in this application without further qualification, reference is made to the chamber 12 and standpipe 15 shown in the drawing.

An evaporator 17 and absorber 18 are interconnected through a gas heat exchanger 19 for the circulation of an inert gas, such as hydrogen, therebetween as well known in the art. The evaporator 17 is supplied with liquid refrigerant from a condenser 20 provided with fins for air cooling.

In the present embodiment of this invention there is provided a series of vertically disposed solution transfer vessels illustrated by a vertically elongated vessel 21 divided by partitions 22 and 23 into a lower chamber 24, an intermediate chamber 25, and upper chamber 26. The lower parts of chambers 24 and 25 are connected by a conduit 27 and the upper parts of chambers 25 and 26 are connected by a conduit 28. A vapor lift conduit 29 extends from the lower part of chamber 24 into the upper part of chamber 26. The function of these chambers and their connections will be apparent from the description of operation hereinafter set forth.

The weak solution chamber 12 of the generator is connected through a conduit 30, liquid heat exchanger 31, and conduit 32 to the upper part of the absorber 18. The latter is suitably cooled by a coil 33 arranged to conduct cooling fluid in heat exchange relation therewith. Obviously the absorber may be cooled by air, as indicated for the condenser 20, or by other means such as a secondary cooling system, as well known in the art. The lower part of the absorber is connected through conduit 34, liquid heat exchanger 31, and conduit 35 to the intermediate transfer chamber 25. The upper end of standpipe 15 is connected through a conduit 36 to the upper part of the lower transfer chamber 24 and a conduit 37 connects the strong solution chamber 13 of the generator to the lower part of the upper transfer chamber 26.

The system is charged with a solution of refrigerant in an absorption liquid and an inert pressure equalizing medium. For purposes of description the charge may comprise a solution of ammonia in water and hydrogen. In operation, ammonia expelled from solution by heat in the generator passes from the upper end of standpipe 15 through conduit 36 into the transfer chambers 24 and 26 as hereinafter described. From the upper part of chamber 26, ammonia vapor flows in conduit 38 through a rectifier 39 to the condenser 20. From the latter, liquid ammonia flows into the upper part of the evaporator 17 where it flows downwardly over the baffle plates, evaporating by diffusion into the hydrogen.

The resulting gas mixture flows through conduit 40, gas heat exchanger 19, and conduit 41 into the absorber 18 where it flows upwardly through baffle plates in contact with weak absorption liquid which flows from chamber 12 of the generator through conduit 30, liquid heat exchanger 31, and conduit 32 into the upper part of the absorber. Weak gas flows from the upper part of the absorber 18 through conduit 42, gas heat exchanger 19, and conduit 43 back to the evaporator, thus completing the gas cycle.

From the lower part of absorber 18, enriched absorption liquid flows through conduit 34, liquid heat exchanger 31, and conduit 35 into the intermediate transfer chamber 25. Any ammonia expelled from solution in the liquid heat exchanger flows from the upper part of chamber 25 through conduit 28 into the upper part of chamber 26 where it joins ammonia vapor flowing to the condenser. From the lower part of chamber 25 rich absorption liquid flows through conduit 27 into the lower transfer chamber 24. Ammonia vapor entering the latter from the generator through conduit 36 raises solution through the vapor lift conduit 29 into the upper transfer chamber 26 in a manner well known in the art.

From chamber 26, the enriched absorption solution flows through conduit 37 into the chamber 13 of the generator. The latter being heated, vapor is expelled from solution and raises liquid through the vapor lift conduit 16 into the standpipe 15 where the liquid and vapor are separated, the liquid flowing downwardly in the standpipe and the vapor flowing toward the condenser through conduit 36.

In the arrangement above described, vapor expelled from solution in the chamber 13 of the generator raises liquid through the vapor lift conduit 16 under a head of liquid standing in the upper transfer chamber 26, and the vapor from the standpipe 15 raises liquid from the lower transfer chamber 24 into the upper chamber 26 under a liquid head standing in the intermediate chamber 25. The liquid level in the latter is the same as the liquid level in the absorber 18. Vapor from the generator raising liquid from chamber 24 into chamber 26 through the vapor lift 29 is brought into intimate contact with the enriched absorption solution, thereby obtaining much better analyzation than if the vapor were merely passed over the surface of the liquid.

If the apparatus is charged at the absorber 18, which is customary, it would be necessary to tilt the unit before starting the first time in order to run some solution into the pump chamber 13. This can be avoided by providing a trap arrangement 44 connected between the chamber 13 and the lower part of the intermediate transfer chamber 25. Solution would then flow from chamber 25 through the trap 44 into the pump chamber 13. During operation, the difference in pressure between chambers 13 and 25 is balanced by a liquid column in the trap. In order to decrease the depth of the trap, two or more traps may be arranged in series.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. In an absorption refrigeration system of the pressure equalized type, a generator, an absorber, a plurality of vapor liquid lift members arranged in series for raising absorption solution from said absorber into said generator, the first of said members being supplied with vapor directly from said generator.

2. In an absorption refrigeration system, an absorber, a first externally heated zone, a second externally heated zone, members for circulation of solution from a first liquid level in said absorber through said zones in series respectively at higher liquid levels, means for conducting vapor from said second zone through the solution beneath the liquid level thereof to produce an internally heated zone, said members cooperating with said first zone and said internally heated zone to cause said circulation of solution, and means for conducting vapor from said internally heated zone through a condensation-evaporation cycle to said absorber.

3. An absorption refrigeration system including a generator, an absorber, an evaporator above said absorber, a gas heat exchanger, means including said gas heat exchanger interconnecting said evaporator and absorber for circulation of gas therebetween, and means for circulating absorption liquid between said generator and absorber including a vapor liquid lift for raising liquid from a first level determined by the surface level of liquid in said absorber to a higher liquid level, and a second vapor liquid lift for flowing liquid from said higher level into said generator.

4. In an absorption refrigeration system of the pressure equalized type, a generator, an absorber, an evaporator above said absorber, a gas heat exchanger, means including said gas heat exchanger interconnecting said evaporator and absorber for circulation of inert gas therebetween, and a plurality of vapor liquid lifts arranged in series for raising absorption solution from said absorber into said generator, the first of said vapor liquid lifts being supplied with vapor directly from said generator.

5. In a process of refrigeration with an absorption system of the pressure equalized type including a generator, an absorber, an evaporator above said absorber, and a gas heat exchanger connected between said absorber and evaporator, and including circulation of inert gas between said absorber and evaporator through said gas heat exchanger due to difference in specific weights of columns of gas in said heat exchanger, a method of circulating absorption liquid which comprises utilizing vapor from the generator to raise enriched solution from a first liquid level determined by the surface level of liquid in the absorber to a higher liquid level, and boiling the solution thus raised to cause flow into the generator.

6. In an absorption refrigeration system, an absorber, an evaporator above said absorber, means including an upright gas heat exchanger interconnecting said absorber and evaporator for circulation of inert gas therebetween, a first externally heated zone, a second externally heated zone, members for circulation of solution from a first liquid level determined by the surface level of liquid in said absorber to higher liquid levels in said zones, means for conducting vapor from said second zone through the solution beneath the liquid level thereof to produce an internally heated zone, said members cooperating with said first zone and said internally heated zone to cause said circulation of solution, and means including said evaporator and gas heat exchanger for conducting vapor from said internally heated zone through a condensation-evaporation cycle to said absorber.

7. In a process of refrigeration with an absorption system of a pressure equalized type including a generator and an absorber, the method of circulating absorption liquid which comprises utilizing vapor from the generator to raise enriched solution from a first liquid level to a higher liquid level, and boiling the solution thus raised to cause further upward flow thereof into said generator by vapor lift action.

8. In a process of refrigeration with an absorption system of a pressure equalized type including a generator and an absorber, flowing absorption liquid into the generator by vapor lift action, by providing a liquid column for such action and utilizing vapor from said generator to raise enriched solution from a first level determined by the surface level of liquid in said absorber to a higher liquid level.

9. In a process of refrigeration with an absorption system of a pressure equalized type including a generator and an absorber, causing circulation of absorption solution between the generator and absorber by vapor lift action, and aiding said circulation by utilizing vapor from said generator to raise enriched solution from a first level determined by the surface level of liquid in said absorber to a higher liquid level.

10. In an absorption refrigeration system, a generator, an absorber, a conduit for conducting weak absorption solution from said generator to said absorber, means for returning enriched solution from said absorber to said generator including a first vapor liquid lift supplied with vapor from said generator, and a second vapor liquid lift supplied with vapor by heating of solution therein.

11. In an absorption refrigeration system, a generator, an absorber, and means for circulating absorption solution between said generator and absorber including a vapor liquid lift for raising solution into said generator, a second vapor liquid lift for raising enriched solution from said absorber to a greater head above said first vapor liquid lift, and means for supplying said second vapor liquid lift with vapor from said generator.

12. In an absorption refrigeration system, a generator, an absorber, a vapor liquid lift supplied with vapor from said generator for raising enriched solution from a first liquid level determined by the surface level of liquid in said absorber to a higher liquid level, and a second vapor liquid lift for flowing solution from said higher level into said generator.

HARRY K. BERGHOLM.